US 012059648B2

(12) United States Patent
Moore et al.

(10) Patent No.: US 12,059,648 B2
(45) Date of Patent: Aug. 13, 2024

(54) CARBON DIOXIDE CAPTURE SYSTEM AND METHOD OF CAPTURING CARBON DIOXIDE

(71) Applicant: General Electric Company, Schenectady, NY (US)

(72) Inventors: David Roger Moore, Rexford, NY (US); Vitali Victor Lissianski, Schenectady, NY (US); Mark Daniel Doherty, Niskayuna, NY (US); Daniel Jason Erno, Clifton Park, NY (US); Anil Raj Duggal, Niskayuna, NY (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 259 days.

(21) Appl. No.: 17/168,792

(22) Filed: Feb. 5, 2021

(65) Prior Publication Data

US 2022/0250002 A1 Aug. 11, 2022

(51) Int. Cl.
*B01D 53/14* (2006.01)
*B01D 53/62* (2006.01)
*C01B 32/50* (2017.01)

(52) U.S. Cl.
CPC ..... *B01D 53/1475* (2013.01); *B01D 53/1406* (2013.01); *B01D 53/1418* (2013.01);
(Continued)

(58) Field of Classification Search
CPC ............ B01D 53/1475; B01D 53/1406; B01D 53/1418; B01D 53/62; B01D 2257/504; C91B 32/50
(Continued)

(56) References Cited

U.S. PATENT DOCUMENTS 7,947,120 B2 5/2011 Deckman et al.
8,500,855 B2 8/2013 Eisenberger
(Continued)

FOREIGN PATENT DOCUMENTS

EP 0232840 A2 8/1987
EP 3653282 A1 5/2020
(Continued)

OTHER PUBLICATIONS

PCT International Search Report dated Jul. 19, 2022 from corresponding International Application No. PCT/US2022/070434 filed Jan. 31, 2022.
(Continued)

Primary Examiner — Anita Nassiri-Motlagh
(74) Attorney, Agent, or Firm — Grogan, Tuccillo & Vanderleeden LLP

(57) ABSTRACT

A carbon dioxide ($CO_2$) capture system and method for removing $CO_2$ from an inlet gas including a first fluid stream inlet providing for the flow of a first fluid stream, such as an inlet gas containing $CO_2$, and a second fluid stream inlet providing for the flow of a second fluid stream, such as steam, an outlet providing for the flow of a $CO_2$ depleted stream from the $CO_2$ capture system, an outlet providing for the flow of a $CO_2$ stream from the $CO_2$ capture system and a concentrator in fluid communication with the first fluid stream. The system further including a first contactor and a second contactor. Each of the first contactor and the second contactor defining therein a first fluidically-isolated, sorbent-integrated, fluid domain for flow of the first fluid stream and $CO_2$ adsorption and a second fluidically-isolated fluid domain for flow of the second fluid stream to assist in desorption.

24 Claims, 4 Drawing Sheets

(52) U.S. Cl.
CPC .............. *B01D 53/62* (2013.01); *C01B 32/50* (2017.08); *B01D 2257/504* (2013.01); *C01B 2210/0018* (2013.01)

(58) Field of Classification Search
USPC ........................................................ 423/220
See application file for complete search history.

(56) References Cited

U.S. PATENT DOCUMENTS

| | | |
|---|---|---|
| 10,010,829 B2 | 7/2018 | Wright et al. |
| 10,279,306 B2 | 5/2019 | Gebald et al. |
| 10,583,387 B2 | 3/2020 | Custelcean et al. |
| 10,683,644 B2 | 6/2020 | Kim et al. |
| 10,821,393 B2 | 11/2020 | Elliott et al. |
| 2008/0289495 A1 | 11/2008 | Eisenberger et al. |
| 2009/0025555 A1 | 1/2009 | Lively et al. |
| 2010/0024651 A1 | 2/2010 | Bansal |
| 2014/0271420 A1 | 9/2014 | Kirchman |

FOREIGN PATENT DOCUMENTS

| | | | |
|---|---|---|---|
| WO | 2013003955 | 1/2013 | |
| WO | 2015005791 A1 | 1/2015 | |
| WO | 2017165975 | 10/2017 | |
| WO | 2019082000 A1 | 5/2019 | |
| WO | 2019161114 A1 | 8/2019 | |
| WO | 2019191651 A1 | 10/2019 | |
| WO | WO-2020039459 A1 * | 2/2020 | ............ F03D 1/025 |
| WO | 2020113281 A1 | 6/2020 | |
| WO | 2020148460 A1 | 7/2020 | |

OTHER PUBLICATIONS

Shi, Xiaoyang, et al., "Sorbents for the Direct Capture of $CO_2$ from Ambient Air", Angewandte Chemie International Edition, vol. 59, Issue: 18, pp. 1-25.

Lackner, K.S, "Capture of carbon dioxide from ambient air", The European Physical Journal Special Topics, 176, 2009.

Samari, M., Ridha, F., Manovic, V. et al., "Direct capture of carbon dioxide from air via lime-based sorbents", Mitig Adapt Strateg Glob Change 25, 25 41 (2020).

* cited by examiner

CARBON DIOXIDE CAPTURE SYSTEM AND METHOD OF CAPTURING CARBON DIOXIDE

BACKGROUND

Embodiments of the present disclosure relate to a carbon dioxide ($CO_2$) capture system and method of capturing $CO_2$, and more particularly, to a $CO_2$ capture system including at least one contactor to extract $CO_2$ from air using sorbents and thermally-enhanced recovery efforts.

Global energy demands are met largely through the combustion of fossil fuels, which produces greater than 35 gigatons of $CO_2$ annually. Direct air capture is a carbon capture process that could address both current and legacy $CO_2$ emissions. Although current direct air capture solutions show promise, system costs are prohibitive due to challenges that include efficient, high capacity capture of dilute concentrations (~400 ppmv) of $CO_2$ in the atmosphere, material lifecycle and stability, and effects of pressure drop across the contactor on system economics and energy consumption. The National Academies of Sciences, Engineering, and Medicine Negative Emissions Technologies estimates the cost of $CO_2$ capture using existing technologies to be in the range of $141-$265/ton using liquid solvents and $88-$228/ton using solid sorbents. These costs are too high for technologies to be commercially viable.

It may therefore be desirable to develop novel $CO_2$ capture system capable of capturing $CO_2$ in the air and method of capturing $CO_2$ in the air that advantageously require low energy and can operate at a costs that is commercially viable, have a relatively small footprint and can be deployed at locations with higher wind speeds, such as rooftops of commercial buildings, where state of the art technologies, cannot be deployed.

BRIEF DESCRIPTION

In accordance with aspects of the present disclosure, a novel $CO_2$ capture system is presented. The novel $CO_2$ capture system includes a first fluid stream inlet providing for the flow of a first fluid stream into the $CO_2$ capture system, a second fluid stream inlet providing for the flow of a second fluid stream into the $CO_2$ capture system, an outlet providing for the flow of a $CO_2$ depleted stream from the $CO_2$ capture system, an outlet providing for the flow of a $CO_2$ stream from the $CO_2$ capture system and at least one concentrator in fluid communication with the first fluid stream. The first fluid stream comprising an inlet gas. The second fluid stream comprising a gas having a temperature greater than the inlet gas.

In accordance with another aspect of the present disclosure, a novel $CO_2$ capture system is presented. The novel $CO_2$ capture system includes a first fluid stream inlet providing for the flow of a first fluid stream into the $CO_2$ capture system and a second fluid stream inlet providing for the flow of a second fluid stream into the $CO_2$ capture system, a first contactor in fluid communication with the first fluid stream inlet and the second fluid stream inlet and a second contactor in fluid communication with the first fluid stream inlet and the second fluid stream inlet. The first fluid stream comprising an inlet gas. The second fluid stream comprising a gas having a temperature greater than the inlet gas. Each of the first contactor and the second contactor defining therein a first fluidically-isolated, sorbent-integrated, fluid domain for flow of the first fluid stream and $CO_2$ adsorption and a second fluidically-isolated fluid domain a second fluidically-isolated fluid domain for flow of the second fluid stream, wherein the second fluidically-isolated fluid domain is in thermal communication with the first fluidically-isolated, sorbent-integrated, fluid domain.

In accordance with yet another aspect of the present disclosure, a method for removing carbon dioxide ($CO_2$) from an inlet gas in a $CO_2$ capture system is presented. The novel method includes inputting into the $CO_2$ capture system a first fluid stream via a first fluid stream inlet, inputting into the $CO_2$ capture system a second fluid stream via a second fluid stream inlet, and providing an output of a $CO_2$ depleted stream and a $CO_2$ stream from the $CO_2$ capture system. The first fluid stream comprising a $CO_2$ containing inlet gas. The first fluid stream inlet comprising a concentrator in fluid communication with the first fluid stream. The second fluid stream comprising a gas having a temperature greater than the $CO_2$ containing inlet gas.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

DRAWINGS

These and other features, aspects, and advantages of the present disclosure will become better understood when the following detailed description is read with reference to the accompanying drawings in which like characters represent like parts throughout the drawings, wherein.

Figure 1:
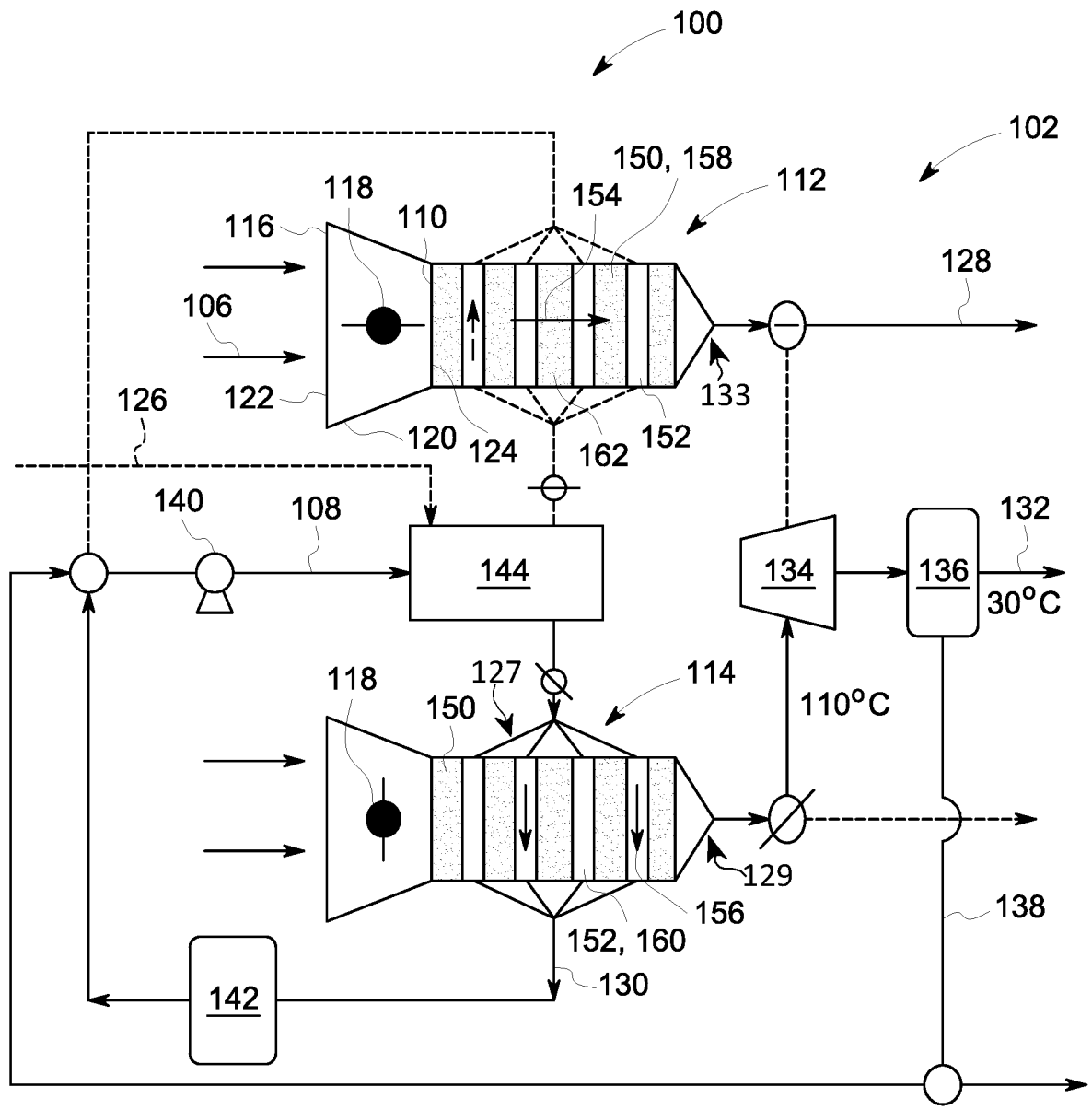
FIG. 1 is a schematic view of a first cycle in an exemplary $CO_2$ capture system for recovering $CO_2$ from an inlet fluid, in accordance with one embodiment of the present disclosure.

Repeat use of reference characters in the present specification and drawings is intended to represent the same or analogous features or elements of the embodiment shown.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "fluid" includes any medium or material that flows, including, but not limited to, air, gas, liquid, and steam.

As will be described in detail hereinafter, various embodiments of a novel $CO_2$ capture system are presented. The novel $CO_2$ capture system includes at least one contactor for the extraction of $CO_2$ from a surrounding fluid, such as ambient air, using sorbents and thermally-enhanced recovery efforts. The disclosed system solves the problem of high $CO_2$ extraction costs by integrating a sorbent with a contactor and by utilizing an air concentrator. The high surface area sorbent-integrated contactor, low pressure drop across the contactor, and air concentrator are key contributors to the system performance. The contactor features a design that contains at least two fluidically-isolated, independent, massively parallel fluid domains: a) sorbent-integrated fluid domain that provides for flow of ambient air and $CO_2$ adsorption from the ambient air flow; b) a second fluid domain to promote desorption via transfer of sensible heat to the sorbent-integrated fluid domain; and c) an optional third fluid domain that can be sorbent integrated or used to promote desorption.

Figure 2:
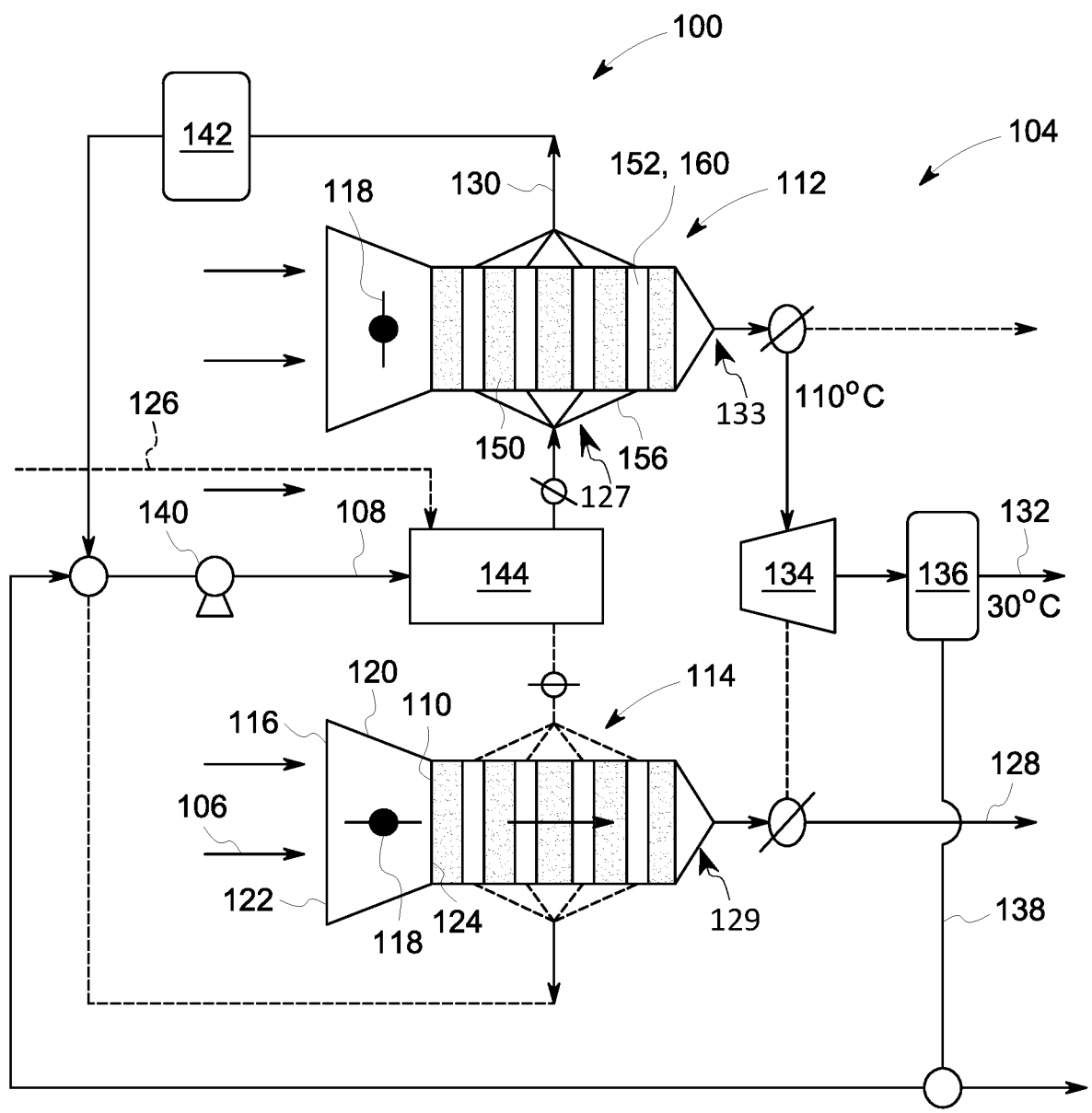
FIG. 2 is a schematic view of a second cycle in the exemplary $CO_2$ capture system of FIG. 1, in accordance with one embodiment of the present disclosure.

Referring now to FIGS. 1 and 2 illustrated is an exemplary embodiment of a $CO_2$ capture system 100 that functions to capture $CO_2$. The $CO_2$ capture system 100 is configured to remove $CO_2$ from a surrounding environment, such as ambient air or other suitable source of air, or other fluid, that comprises $CO_2$, utilizing a hot gas stream (e.g., steam) to assist with desorption. The $CO_2$ capture system 100 of FIGS. 1 and 2 incorporates two contactors (described presently) to provide for continuous operation. FIG. 1 illustrates the $CO_2$ capture system 100 during operation in a first cycle 102 (Cycle A—described presently). FIG. 2 illustrates the $CO_2$ capture system 100, during operation in a second cycle 104 (Cycle B—described presently).

With the growing global energy demand that requires the combustion of fossil fuels, it is becoming increasingly important to cheaply and effectively remove $CO_2$ from ambient air. The $CO_2$ capture system 100 is configured to remove $CO_2$ from an inlet gas stream 106, such as ambient air. The $CO_2$ capture system 100 disclosed herein solves the problem of high $CO_2$ extraction costs by integrating a sorbent with at least one, and preferably two, contactors (described presently) and utilizing an air concentrator to increase air flow through contactors. A high surface area, sorbent-integrated contactor and low pressure drop across the contactor are key contributors to the performance of the $CO_2$ capture system 100. The $CO_2$ capture system 100 provides effective thermal integration by utilizing a hot gas stream 108 during desorption, such as low pressure steam, to assist in desorption via transfer of heat to a fluidically-isolated, sorbent-integrated, fluid domain (described presently) defined within the $CO_2$ capture system 100.

As illustrated in FIGS. 1 and 2, the $CO_2$ capture system 100 comprises a first fluid stream, and more particularly, the inlet gas stream 106, that enters the $CO_2$ capture system 100 at an inlet 110 of a respective contactor during the adsorption phase of operation. In an embodiment, the inlet gas 106 includes ambient air including $CO_2$. For example, in an embodiment, the inlet gas 106 includes direct air capture, such as an inlet gas having approximately 412 ppmv $CO_2$. In an alternate embodiment, the inlet gas 106 includes post-combustion gas capture, such as a post combustion gas having approximately 6-15% $CO_2$. In an embodiment, the inlet gas stream 106 may be cooled first in order to help reduce the volume of the gas, and therefore, to reduce the size and weight of the $CO_2$ capture system 100. During operation in the first cycle 102 (FIG. 1), the inlet gas stream 106 is fed into a first contactor 112, operating in an adsorption mode. During operation in a second cycle 104 (FIG. 2), the inlet gas stream 106 is fed into a second contactor 114, operating in an adsorption mode. In an alternate embodiment, the $CO_2$ capture system 100 may comprise any number (n) of contactors capable of operation in alternating adsorption and desorption modes. The number of included contactors will depend on the concentration of $CO_2$ in the inlet gas stream 106, the volume of the inlet gas stream 106, the desire for continuous operation, and the like. Accordingly, embodiments including a first contactor and at least one additional contactor are anticipated. Embodiments illustrating the inclusion of a first and second contactor 112, 114 are illustrated herein for ease in description.

In the illustrated embodiment of FIGS. 1 and 2, a concentrator 116 enables passive and/or active capture of ambient $CO_2$ from the wind. As the inlet gas stream 106 is fed into the contactor 112 or 114 operating in an adsorption mode, it passes through the concentrator 116 prior to reaching the respective contactor 112, 114. The concentrator 116 increases static wind pressure above pressure drop across the contactor 112, 114, thus relying on wind pressure to move air through the contactor 112, 114. Each of the first and second contactors 112, 114, includes a gate 118 that allows the inlet gas stream 106 to pass through the respective contactor 112, 114 during the $CO_2$ adsorption cycle and blocks air flow through the respective contactor 112, 114 when operating in a $CO_2$ desorption cycle. FIG. 1 illustrates gate 118 disposed proximate to the contactor 112 in an open position to allow for the passage therethrough of the inlet gas 106, and gate 118 disposed proximate to the contactor 114 in a closed position to block the inflow of the inlet gas 106. FIG. 2 illustrates gate 118 disposed proximate to the contactor 112 in a closed position to block the inflow of the inlet gas 106, and gate 118 disposed proximate to the contactor 114 in an open position to allow for the passage therethrough of the inlet gas 106.

Figure 3:
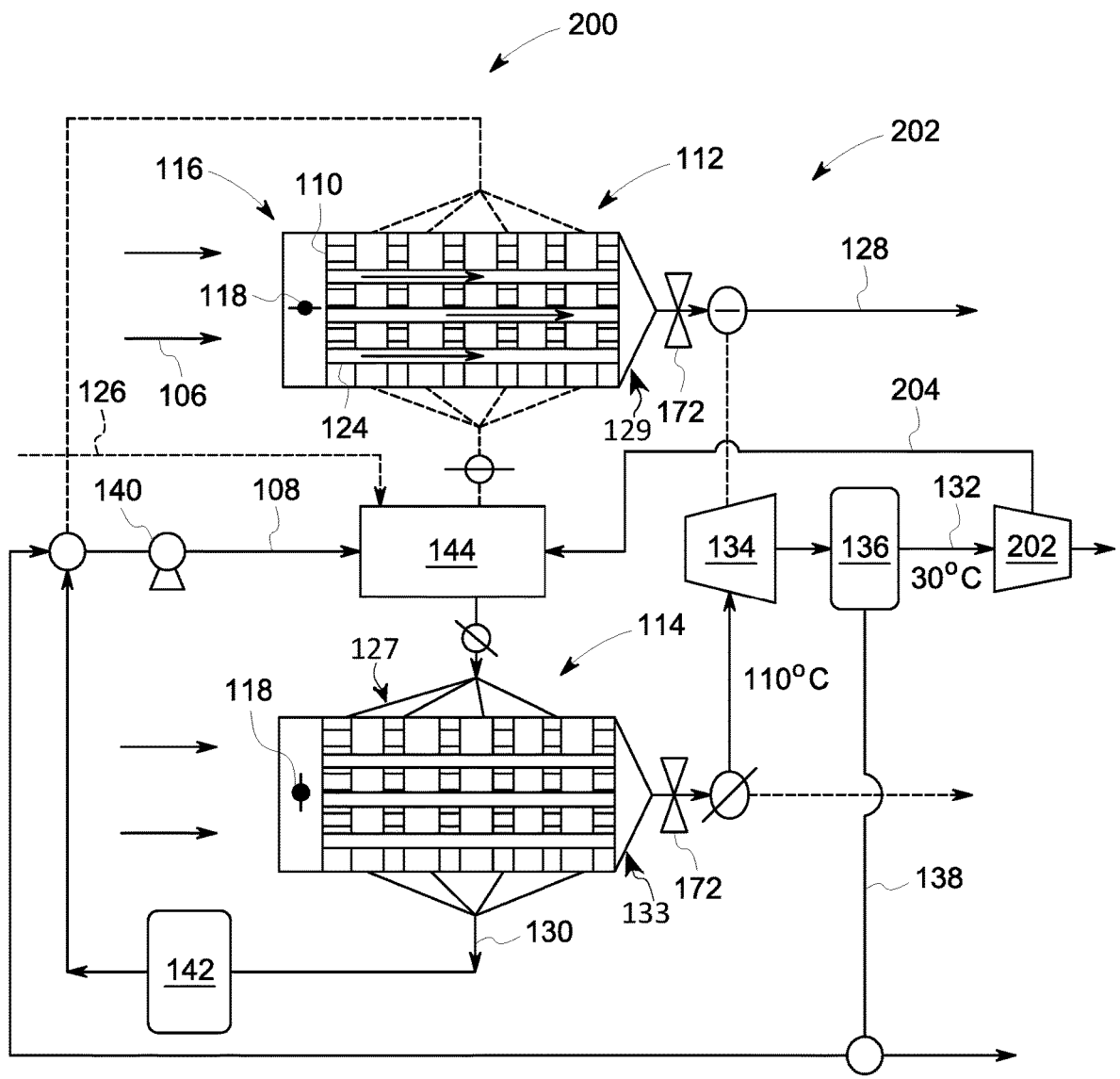
FIG. 3 is a schematic view of a first cycle in another embodiment of a $CO_2$ capture system for recovering $CO_2$ from an inlet fluid, in accordance with one embodiment of the present disclosure.
Figure 4:
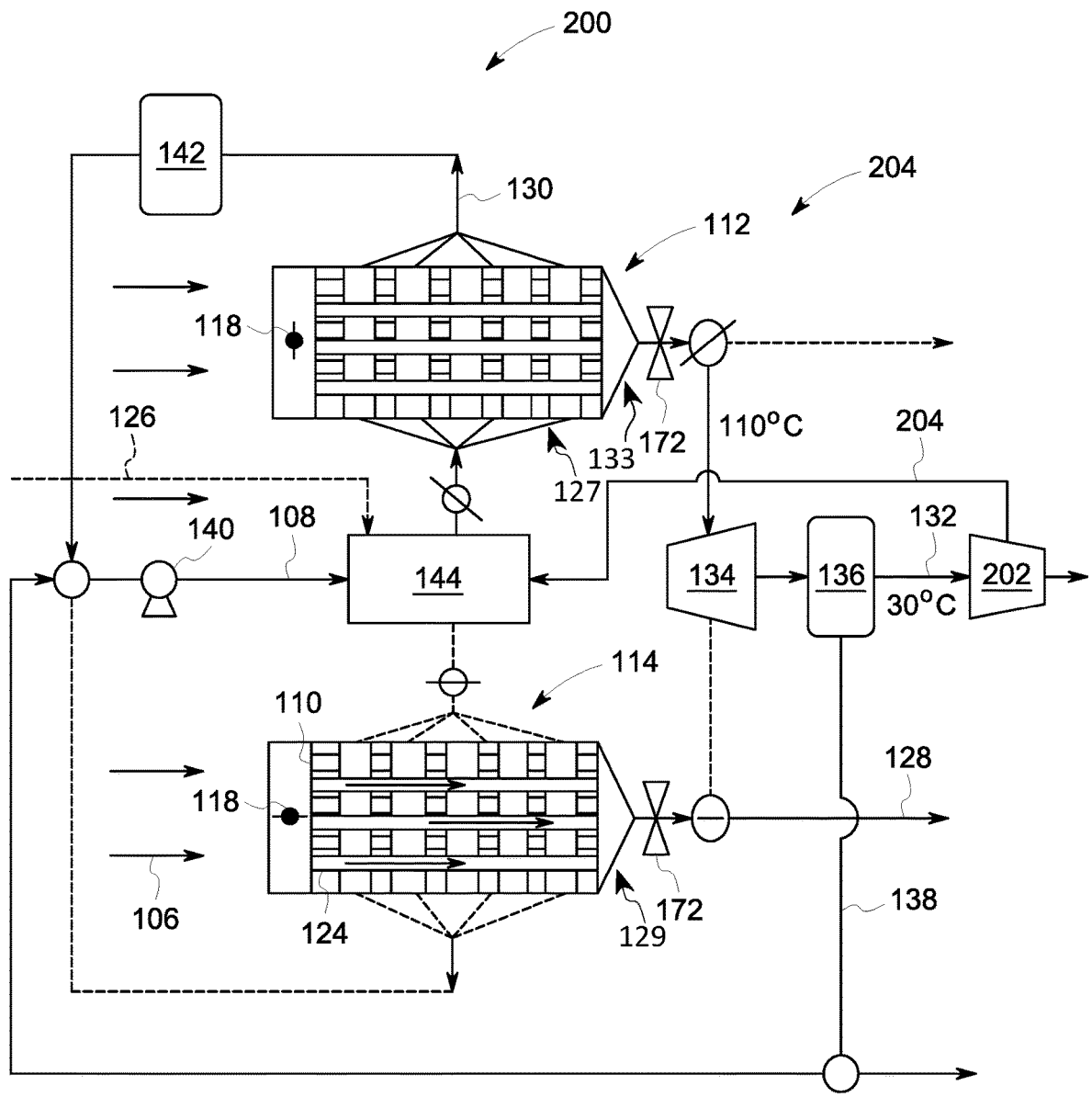
FIG. 4 is a schematic view of a second cycle in the $CO_2$ capture system of FIG. 3, in accordance with one embodiment of the present disclosure.

Referring briefly to FIGS. 3 and 4, illustrated is a second preferred embodiment, of a $CO_2$ capture system 200. Unless otherwise indicated, the second preferred embodiment of the $CO_2$ capture system 200 includes the same components identified during the description of the first preferred embodiment shown in FIGS. 1 and 2. In contrast to the first preferred embodiment, the second preferred embodiment does not include a concentrator for the input of the inlet gas 106. Instead, the second preferred embodiment the inlet gas stream 106 passes directly into the respective contactor 112, 114, such as by the use of a fan 172 to drive air through the contactor 112, 114. It is noted in the second preferred embodiment, a similar type gate structure 118 is associated therewith the inlet 110 of the respective contactor 112, 114, and operable to permit or block the input of the inlet gas 106.

Returning again to FIGS. 1 and 2, the concentrator 116 may be a passive airflow concentrator, meaning no added energy is required for the concentration of the inlet gas stream 106, or an active airflow concentrator, meaning energy is provided to aid with air movement. In the illustrated embodiment of FIGS. 1 and 2, the airflow concentrator 116 is a passive cone-shaped concentrator 120 that does not require the use of additional energy to concentrate the airflow toward the respective contactor 112, 114. The cone-shaped concentrator 120 may be generally shaped to include a diverging-converging geometry and disposed upstream and proximate to the inlet 110 of the respective contactor 112, 114. The cone-shaped concentrator 120 increases wind speed and corresponding wind static pressure at the concentrator outlet. More specifically, air flow such as inlet gas stream 106, is accelerated from a larger opening at an inlet 122 of the concentrator 116 to a smaller opening at an outlet 124 of the concentrator 116. As the inlet gas stream 106 enters the diverging portion, and as the area decreases in the diverging portion as it moves toward the converging portion proximate to the contactor 112, 114, the inlet gas stream 106 velocity increases. Since wind pressure $\Delta P$ is a strong function of wind speed, $\Delta P=0.5\times\rho\times V^2$ ($\rho$ is air density and V is air velocity), flow acceleration increases wind pressure. The dimensions of the concentrator 116 are designed to create wind pressure at the inlet 110 of the contactor 112, 114 that exceeds pressure drop across the contactor 112, 114. The pressure difference between the wind pressure and contactor pressure drop forces air flow through the respective contactor 112, 114 operating in an adsorption mode. A portion of air collected at the inlet 110 of the contactor 112, 114 flows through the contactor. As previously eluded to, in an alternate embodiment, a passive airflow concentrator, such as a fan powered by the movement of the air may be utilized, upstream or downstream of the contactor The hot gas stream 108 originates from a source of heated fluid, such as, but not limited to, a boiler, a gas turbine or internal combustion engine that can provide exhaust gases after natural gas, or some other combustive fuel, is ignited in the engine. Heat from the hot gas stream 108 assists in desorption via transfer of heat to a fluidically-isolated, sorbent-integrated, fluid domain (described presently) defined within the $CO_2$ capture system 100. In an embodiment, the hot gas stream 108, is created by producing steam in a boiler 144. In the illustrated embodiment, energy input to the boiler 144, as illustrated by arrowed line 126, is provided at by one or more of a renewable source of energy, stored energy or turbine energy, such as by a combined cycle gas turbine. Steam may be produced at atmospheric or slightly higher pressure. The hot gas stream 108 is input into the respective contactor 112, 114 at a second fluid stream inlet 127. As steam condenses in a second fluid domain (described presently) of the respective contactor 112, 114, heat released during the condensation is transferred to a first fluid domain containing a sorbent (described presently) of the respective contactor 112, 114. Increasing steam pressure allows for an increase in a steam condensation temperature and thus temperature at which sorbent is regenerated. Alternatively, the hot gas stream 108 may be hot air produced by combustion of a fuel (e.g. natural gas) by utilizing an electric heater, or the like. Again, the $CO_2$ capture system 100 is configured to remove the $CO_2$ from the inlet gas stream 106, assisted during the desorption mode by the heat from the hot gas stream 108.

As previously stated, the $CO_2$ capture system 100 includes two contactors, and more particularly the first contactor 112 and the second contactor 114 to provide alternating adsorption and desorption cycles (FIG. 1—Cycle A and FIG. 2—Cycle B) for continuous $CO_2$ removal from the inlet gas stream 106. More particularly, in the described embodiment, during Cycle A, as best illustrated in FIG. 1, the first contactor 112 serves as an adsorption unit and the second contactor 114 serves as a desorption unit with the inlet gas stream 106 directed through the first contactor 112 and the hot gas stream 108 directed through the second contactor 114. In an embodiment, the contactor acting in the desorption mode of operation experiences a medium-temperature (110° C.) desorption cycle to release $CO_2$ and regenerate a sorbent (described presently) within the contactor. As stated, for continuous $CO_2$ removal, in an embodiment, when the first contactor 112, and more particularly, when the adsorption materials are spent within the first contactor 112, and thus approaches its full sorbent capacity, the air flow, and more particularly, the inlet gas stream 106, through the first contactor 112 is shut down via the gate 118 and directed to the second contactor 114. The first contactor 112 then acts as a desorption unit, as best illustrated in FIG. 2, and the second contactor 114 acts as an absorption unit. The cyclical operation of the first contactor 112 and second contactor 114 in adsorption and desorption states of operation or modes is continuous.

During operation, the inlet gas stream 106 passes through the gate 118 in the concentrator 116 that allows air to pass through the respective contactor 112, 114 operating in the $CO_2$ adsorption mode and blocks air flow during a $CO_2$ desorption cycle. The inlet gas stream 106 exits the adsorption contactor 112, 114 as a $CO_2$ depleted stream 128, and can be vented via an outlet (not shown) to atmosphere or further treated or recycled for energy recovery.

During Cycle A operation, as shown in FIG. 1, when the first contactor 112 is acting as an adsorption unit and the second contactor 114 is acting as a desorption unit, the $CO_2$ depleted stream 128 is vented from the first contactor 112 and a $CO_2$ stream 132 is removed from the second contactor 114 using a vacuum pump 134, and continues on for further treatment, such as compression, sequestration, and the like. The $CO_2$ stream 132 may contain moisture adsorbed by the sorbent along with $CO_2$ during the adsorption cycle. This moisture will be released from the sorbent during the desorption cycle. In an embodiment, the $CO_2$ stream 132 is cooled via an air cooler 136 that may result in condensation of excess moisture 138 that is vented away from the outlet of the $CO_2$ stream 132. At least a portion of the excess moisture 138 may be used as system makeup water and is recirculated via a pump 140 for production of steam in the boiler 144.

During Cycle B operation, as shown in FIG. 2, when the first contactor 112 is acting as a desorption unit and the second contactor 114 is acting as an adsorption unit, the $CO_2$ depleted stream 128 is vented from the second contactor 114 and a $CO_2$ stream 132 is removed from the first contactor 112 using the vacuum pump 134, and continues on for further treatment, such as compression, sequestration, and the like. Similar to the previous, the $CO_2$ stream 132 may include moisture and is cooled via the air cooler 136, and excess moisture 138 vented away from the outlet of the $CO_2$ stream 132.

Referring again briefly to FIGS. 3 and 4, as previously described with regard to FIGS. 1 and 2, the $CO_2$ stream 132 upon exiting the respective contactor 112, 114, may include further treatment, such as compression, sequestration, and the like. Accordingly, as illustrated in FIGS. 3 and 4, the second preferred embodiment includes a compressor 202, thus providing for heat integration via compression from the $CO_2$ stream 132 back to the boiler 144, as shown at 204, to aid with steam production. It should be understood that the inclusion of a compressor, such as compressor 202, in the embodiment of FIGS. 1 and 2 is anticipated by this disclosure.

During operation the hot gas stream 108, and more particularly low-pressure steam, passes through the second contactor 114 (Cycle A) or the first contactor 112 (Cycle B) to assist in desorption via the transfer of heat to a first fluidically-isolated, sorbent-integrated, fluid domain in the respective contactor (described presently), thus providing the heat required for $CO_2$ desorption and sorbent regeneration. The hot gas stream 108 is recirculated through the $CO_2$ capture system 100 via a pump 140. In an embodiment, the excess moisture removed from the $CO_2$ stream 132 by the air cooler 136, may be routed to the hot gas stream 108.

As previously stated, each of the contactors 112, 114 features two fluidically-isolated fluid domains. Alternatively, a unique, multi-furcating design can be employed to increase contactor surface area. The multi-furcating design includes two fluidically-isolated, independent, massively parallel fluid domains. The contactors 112, 114 with multi-furcating design may be formed using the unique capabilities of additive manufacturing to enable the fabrication of, and sorbent integration, into structures with larger surface/weight ratios and much lower pressure drops than conventional contactors. The parallel fluid domains of each of the contactors 112, 114 include: (i) a first fluidically-isolated, sorbent-integrated, fluid domain 150; and (ii) a second fluidically-isolated fluid domain 152, each defining a fluid flow path, or channel, for the flow of a fluid. The term "fluidically-isolated" as used herein is intended to note isolation of the fluid through each domain from fluid in another domain, so as to prevent mixing of the fluids or direct contact therebetween. During an adsorption stage of operation, the first fluidically-isolated, sorbent-integrated, fluid domain 150 provides for flow of a first fluid stream 154, and more particularly the inlet gas stream 106, and $CO_2$ adsorption. The second fluidically-isolated fluid domain 152 provides for flow of a second fluid stream 156, and more particularly the hot gas stream 108, to assist in desorption, during a desorption stage of operation, via transfer of heat to the first fluidically-isolated, sorbent-integrated, fluid domain 150.

The first fluid domain 150 defines therein a sorbent-integrated channel, or flow path, 158 for flow of the first fluid stream 154, and more particularly the inlet gas stream 106, and $CO_2$ adsorption. The second fluid domain 152 defines a second fluid stream channel, or flow path, and more particularly, a warming channel 160 to promote desorption via transfer of sensible heat to the sorbent-integrated channel 158, and more particularly, the first fluid domain 150. Also stated, the second fluidically-isolated fluid domain 152 is in thermal communication with the first fluidically-isolated, sorbent-integrated, fluid domain 150.

During operation, the first fluid stream 154 is first directed through the sorbent-integrated channel 158, and more particularly, the first fluid domain 150. Here, $CO_2$ is adsorbed into a sorbent material 162 until the sorbent material 162 reaches its full $CO_2$ adsorption capacity. In an embodiment, the sorbent material 162 may comprise metal-organic frameworks (MOF); covalent organic frameworks (COF), such as COF-A1; zeolites, such as B-SSZ-13; $NH_2$ impregnated materials, or the like. In an embodiment, the sorbent-integrated channel 158 may coated with the sorbent material 162, loaded/filled with the sorbent material 162 or formed/made of the sorbent material 162. In an alternate embodiment, the design may include fabrication of the contactor, and more particularly, the first fluid domain 150, from a sorbent itself (e.g., using Binder Jet) and coating some of the contactor channels with a hydrophobic coating, such as, a silica nano-coating, fluorinated silanes and fluoropolymer coatings, to prevent direct contact of sorbent and steam during the regeneration/desorption cycle. As illustrated a $CO_2$ depleted stream 128 is output from the first fluid domain 150 subsequent to adsorption of the $CO_2$ from the first fluid stream 154.

Desorption takes place within the contactor 112 in a Cycle B, as illustrated in FIG. 2. During this step, the first fluid stream 154 of inlet gas flowing through the sorbent-integrated channel 158 (FIG. 1) is shut down via the gate 118 and a flow of hot gas, and more particularly the second fluid stream 156, is opened through the warming channel 160 defined by the second fluid domain 152 to provide desorption in the first fluid domain 150. In an embodiment, the second fluid stream 156 has a temperature that is greater than the first fluid stream 154. In a preferred embodiment, the second fluid stream 156 has a temperature greater than 85° C. This drives an appropriate temperature gradient, to provide for the transfer of heat from the second fluid stream 156 to the sorbent material 158 in the first fluid domain 150, initiating desorption. As the sorbent-integrated channel 158 temperature reaches 85° C., the sorbent material 162 releases $CO_2$, which is pulled from the first fluid domain 150 via a vacuum pump 134.

The $CO_2$ capture systems 100, 200 of the present disclosure can comprise the at least one contactor, such as the contactor 112, 114, with any well-known sorbent material for the sorbent material 162, such as MOFs, COFs, zeolites, $NH_2$ impregnated materials, and others. This system can utilize the sorbent material 162 and the contactor 112, 114 at the appropriate partial pressure to absorb the $CO_2$ from the inlet gas or first fluid stream 154.

The use of alternative cycling of two contactors, and namely the first contactor 112 and the second contactor 114 of FIGS. 1 and 2 and similarly FIGS. 3 and 4, for continuous $CO_2$ removal where each contactor has massively parallel fluid domains results in low pressure drop, and the separation of the fluids avoids contamination of the $CO_2$ stream and offers indirect heat exchange. The contactor can be manufactured using additive technology, such as, for instance, binder-jet techniques, or some other means of manufacturing. The described system provides commercial advantages by providing the ability to operate in a wide range of low energy requirements. The technology can be deployed at locations with higher wind speeds, such as rooftops of commercial buildings, where state of the art technologies, cannot be deployed. Additional market opportunities may include consumer $CO_2$, industrial $CO_2$ capture and desalination.

The $CO_2$ capture system 100 is shown in FIGS. 1-4 in cutaway to reveal the individual contactors 112, 114 and flow of the fluid streams therethrough. As previously asserted, the $CO_2$ capture systems 100, 200 can contain a single contactor or any number of contactors, and the number of contactors selected for use in a given system will depend at least in part on the concentration of $CO_2$ in the inlet gas stream 106, the volume of the inlet gas stream 106, the desire for continuous operation, and the like. Accordingly, embodiments including a first contactor, and at least one additional contactor are anticipated. Embodiments illustrating the inclusion of a first and second contactor are illustrated herein for ease in description.

The various embodiments of the $CO_2$ capture system as described hereinabove dramatically improves the ability to extract $CO_2$ from an inlet gas, such as ambient air, utilizing less energy and thus at a lower costs. The use of a concentrator combined with a low pressure drop across the contactor allows the $CO_2$ capture system to operate in a passive mode thus reducing energy requirements. The integration of a sorbent with a contactor and the transfer of sensible heat to the sorbent channel to assist with desorption, produces a $CO_2$ stream not contaminated with the fluid used to supply sensible heat. By way of example, the use of a contactor multi-furcating design enabling thermally enhanced recovery of $CO_2$ in the inlet gas, reduces the cost of operation of the overall system. The use of alternative cycling of at least two contactors for continuous $CO_2$ removal where each contactor includes the multi-furcating design, and more particularly includes massively parallel channels, results in low pressure drop and offers indirect heat exchange described hereinabove which aids with effective energy transfer in the $CO_2$ capture system. The various embodiments of the $CO_2$ capture system, and contactor design, described hereinabove therefore present a fuel-efficient, two-cycle system architecture that generates a $CO_2$ stream from the inlet gas stream.

The terminology used herein is for the purpose of describing particular embodiments only and is not intended to be limiting of the invention. Ranges disclosed herein are inclusive and combinable of the endpoints and all intermediate values of the ranges. "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While the disclosure has been described with reference to an exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A carbon dioxide ($CO_2$) capture system, comprising:
   at least one contactor;
   a first fluid stream inlet providing for a flow of a first fluid stream into the at least one contactor;
   a second fluid stream inlet providing for a flow of a second fluid stream into the at least one contactor;
   an outlet providing for a flow of a $CO_2$ depleted stream from the at least one contactor;
   an outlet providing for a flow of a $CO_2$ stream from the at least one contactor; and
   at least one concentrator in fluid communication with the first fluid stream at an inlet of the at least one contactor to increase a static wind pressure about the at least one concentrator to above a pressure drop across the at least one contactor, wherein the at least one concentrator includes a first axial end in direct fluid communication with ambient air entering into the at least one concentrator in an axial flow direction and a second axial end opposing the first axial end that is directly coupled to the inlet of the at least one contactor, wherein only an axial flow of the first fluid stream enters the at least one concentrator at the first axial end in the axial flow direction and travels to the second axial end for passage into the inlet of the at least one contactor, and wherein the at least one concentrator is a cone-shaped concentrator having a diverging portion at the first axial end to directly receive the axial flow of the first fluid stream that transitions to a converging portion at the second axial end that supplies the axial flow of the first fluid stream to the inlet of the at least one contactor at an increased velocity and increased wind pressure that exceeds the pressure drop across the at least one contactor, and a gate disposed the diverging portion and the converging portion to control the axial flow of the first fluid stream to the at least one contactor, wherein the gate is configured to open and close as a function of whether the at least one contactor is operating in a $CO_2$ adsorption cycle or a $CO_2$ desorption cycle.

2. The $CO_2$ capture system of claim 1, wherein the at least one contactor comprises:
   a first contactor in fluid communication with the first fluid stream inlet and the second fluid stream inlet; and
   at least one additional contactor in fluid communication with the first fluid stream inlet and the second fluid stream inlet,
   wherein each of the first contactor and the at least one additional contactor define therein:
   a first fluidically-isolated, sorbent-integrated, fluid domain for flow of the first fluid stream and $CO_2$ adsorption; and
   a second fluidically-isolated fluid domain for flow of the second fluid stream, wherein the second fluidically-isolated fluid domain is in thermal communication with the first fluidically-isolated, sorbent-integrated, fluid domain.

3. The $CO_2$ capture system of claim 2, wherein the first fluidically-isolated, sorbent-integrated, fluid domain is a sorbent-coated channel.

4. The $CO_2$ capture system of claim 2, wherein the first fluidically-isolated, sorbent-integrated, fluid domain is defined by a channel filled with a sorbent material.

5. The $CO_2$ capture system of claim 2, wherein the at least one additional contactor comprises a second contactor in fluid communication with the first fluid stream inlet and the second fluid stream inlet, wherein the first contactor and the second contactor are configured to operate in alternative cycles for continuous operation.

6. The $CO_2$ capture system of claim 5, wherein the first contactor is configured to operate as an adsorption unit when the second contactor is configured to operate as a desorption unit and wherein the first contactor is configured to operate as a desorption unit when the second contactor is configured to operate as adsorption unit.

7. The $CO_2$ capture system of claim 2, wherein the first fluid stream is ambient air containing $CO_2$ and the second fluid stream is steam.

8. The $CO_2$ capture system of claim 2, wherein the first fluid stream is a post combustion gas containing $CO_2$ and the second fluid stream is steam.

9. A carbon dioxide ($CO_2$) capture system, comprising:
a first fluid stream inlet providing for a flow of a first fluid stream into the $CO_2$ capture system and a second fluid stream inlet providing for a flow of a second fluid stream into the $CO_2$ capture system, the first fluid stream comprising an inlet gas, and the second fluid stream comprising a gas having a temperature greater than the inlet gas;
a first contactor in fluid communication with the first fluid stream inlet and the second fluid stream inlet;
a second contactor in fluid communication with the first fluid stream inlet and the second fluid stream inlet,
wherein each of the first contactor and the second contactor define therein:
a first fluidically-isolated, sorbent-integrated, fluid domain for the flow of the first fluid stream and $CO_2$ adsorption; and
a second fluidically-isolated fluid domain for the flow of the second fluid stream, wherein the second fluidically-isolated fluid domain is in thermal communication with the first fluidically-isolated, sorbent-integrated, fluid domain; and
a first concentrator and a second concentrator correspondingly in fluid communication with the first fluid stream at an inlet of the first contactor and the second contactor, wherein the first concentrator and the second concentrator each includes a first axial end in direct fluid communication with ambient air entering into the concentrators in an axial flow direction and a second axial end opposing the first axial end that is directly coupled correspondingly to the inlet of the first contactor and the inlet of the second contactor, wherein only an axial flow of the first fluid stream enters the concentrators at the first axial end in the axial flow direction and travels to the second axial end for correspondingly passage into the inlet of the first contactor and the second contactor, and wherein each of the first concentrator and the second concentrator is a cone-shaped concentrator having a diverging portion at the first axial end to directly receive the axial flow of the first fluid stream that transitions to a converging portion at the second axial end that correspondingly supplies the axial flow of the first fluid stream to the inlet of the first contactor and the second contactor at an increased velocity and increased wind pressure that exceeds the pressure drop across the first contactor and the second contactor, and a gate disposed about the diverging portion and the converging portion to control the axial flow of the first fluid stream to the first contactor and the second contactor, wherein the gate is configured to open and close as a function of whether the first contactor and the second contactor are operating in a $CO_2$ adsorption cycle or a $CO_2$ desorption cycle.

10. The $CO_2$ capture system of claim 9, wherein the first fluidically-isolated, sorbent-integrated, fluid domain is a sorbent-coated channel.

11. The $CO_2$ capture system of claim 9, wherein the first fluidically-isolated, sorbent-integrated, fluid domain is defined by a channel filled with a sorbent material.

12. The $CO_2$ capture system of claim 9, wherein the first contactor is configured to operate as an adsorption unit when the second contactor is configured to operate as a desorption unit.

13. The $CO_2$ capture system of claim 9, wherein the first contactor is configured to operate as a desorption unit when the second contactor is configured to operate as adsorption unit.

14. The $CO_2$ capture system of claim 9, wherein the first fluid stream is ambient air containing $CO_2$.

15. The $CO_2$ capture system of claim 9, wherein the first fluid stream is a post combustion gas containing $CO_2$.

16. The $CO_2$ capture system of claim 9, wherein the second fluid stream is steam.

17. A method for removing carbon dioxide ($CO_2$) from an inlet gas in a $CO_2$ capture system having at least one contactor, comprising:
inputting into the at least one contactor a first fluid stream via a first fluid stream inlet, the first fluid stream comprising an axial flow of a $CO_2$ containing inlet gas and wherein the first fluid stream inlet comprises at least one concentrator in fluid communication with the first fluid stream at an inlet of the at least one contactor to increase a static wind pressure about the at least one concentrator to above a pressure drop across the at least one contactor, wherein the at least one concentrator includes a first axial end in direct fluid communication with ambient air entering into the at least one concentrator in an axial flow direction and a second axial end opposing the first axial end that is directly coupled to the inlet of the at least one contactor, wherein only an axial flow of the first fluid stream enters the at least one concentrator at the first axial end in the axial flow direction and travels to the second axial end for passage into the inlet of the at least one contactor, and wherein the at least one concentrator is a cone-shaped concentrator having a diverging portion at the first axial end to directly receive the axial flow of the first fluid stream that transitions to a converging portion at the second axial end that supplies the axial flow of the first fluid stream to the inlet of the at least one contactor at an increased velocity and increased wind pressure that exceeds the pressure drop across the at least one contactor, and a gate disposed about the diverging portion and the converging portion to control the axial flow of the first fluid stream to the at least one contactor, wherein the gate is configured to open and close as a function of whether the at least one contactor is operating in a $CO_2$ adsorption cycle or a $CO_2$ desorption cycle;
inputting into the at least one contactor a second fluid stream via a second fluid stream inlet, the second fluid stream comprising a gas having a temperature greater than the $CO_2$ containing inlet gas; and
providing an output of a $CO_2$ depleted stream and a $CO_2$ stream from the at least one contactor.

18. The method of claim 17, wherein the at least one contactor comprises:

a first contactor in fluid communication with a first fluid flow path and at least one additional contactor in fluid communication with a second fluid flow path, wherein the first contactor and the at least one additional contactor are configured to operate in alternative cycles for continuous operation of a $CO_2$ capture system;

the method further comprising:

operating the first contactor in fluid communication with the first fluid flow path in one of the $CO_2$ adsorption cycle or the $CO_2$ desorption cycle; and simultaneously operating at least one of the at least one additional contactor in fluid communication with the second fluid flow path in the other of the adsorption cycle or the desorption cycle, providing continuous operation of the $CO_2$ capture system, wherein each of the first and at least one additional contactors comprise:

a first fluidically-isolated, sorbent-integrated, fluid domain for flow of the first fluid flow and $CO_2$ adsorption; and a second fluidically-isolated fluid domain for flow of the second fluid flow, wherein the second fluidically-isolated fluid domain is in thermal communication with the first fluidically-isolated sorbent-integrated, fluid domain.

19. The method of claim 18, wherein the first fluidically-isolated, sorbent-integrated, fluid domain defines a sorbent-coated channel for the adsorption of $CO_2$ into the sorbent material until the material reaches its full $CO_2$ adsorption capacity and the second fluidically-isolated fluid domain defines a warming channel to drive the appropriate temperature gradient and initiate desorption.

20. The method of claim 18, wherein the first contactor is configured to operate as an adsorption unit when the at least one of the at least one additional contactor is configured to operate as a desorption unit and the first contactor is configured to operate as a desorption unit when the at least one of the at least one additional contactor is configured to operate as adsorption unit.

21. The method of claim 18, wherein the first fluid stream is ambient air including $CO_2$ and the second fluid stream is steam.

22. The $CO_2$ capture system of claim 1, wherein the gate is disposed between the first axial end and the second axial end of the at least one concentrator.

23. The $CO_2$ capture system of claim 9, wherein the gate is disposed between the first axial end and the second axial end of the concentrators.

24. The method claim 17, wherein the gate is disposed between the first axial end and the second axial end of the at least one concentrator.

* * * * *